July 26, 1932.  G. H. WHITTINGHAM  1,869,034
DISCONNECTING RELAY FOR REVERSE CURRENT BRAKING DEVICES
Filed April 18, 1931
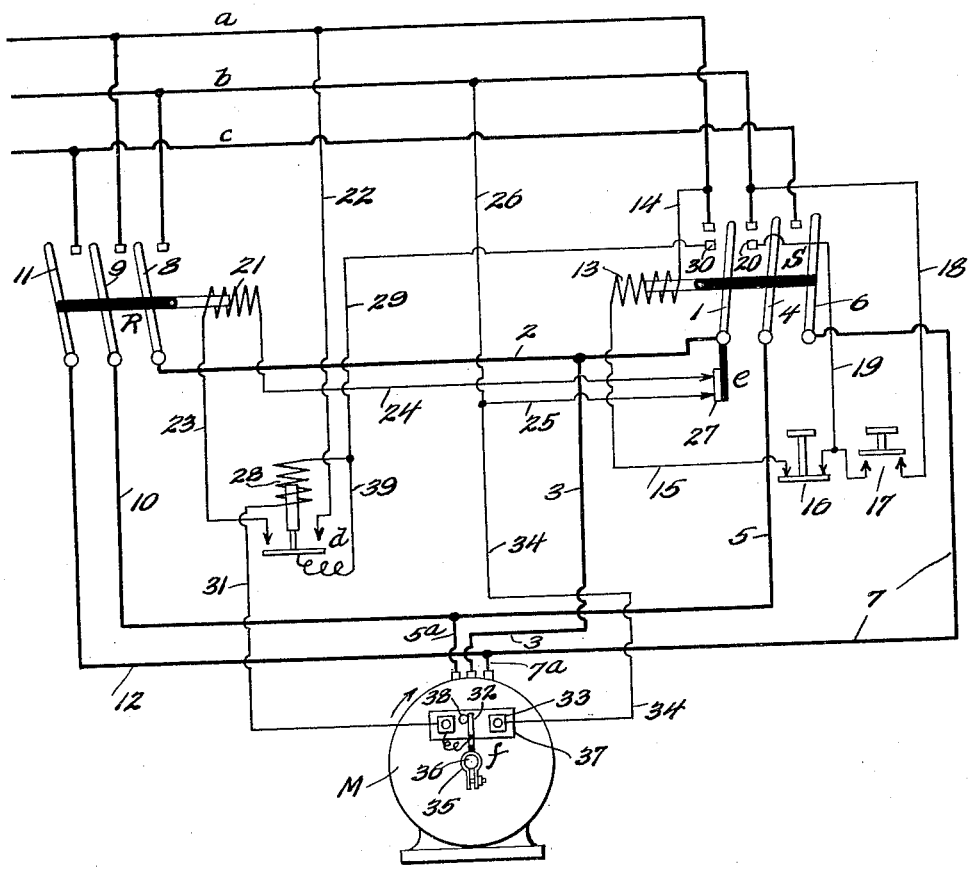
Inventor
George H. Whittingham
By Robert Watson
Attorney Patented July 26, 1932

1,869,034

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

DISCONNECTING RELAY FOR REVERSE CURRENT BRAKING DEVICES

Application filed April 18, 1931. Serial No. 531,238.

In stopping multiphase induction motors of the wound rotor type, it is customary, after opening the main switch, to temporarily close a switch which causes a reversal of the current phases in the stator windings with consequent braking action on the rotor which quickly causes it to stop rotating in the direction in which it has been running. To prevent backward rotation of the rotor, the reverse current switch must be opened approximately at the moment when the rotor comes to rest. The reverse switch is provided with an electromagnet for closing it, upon the opening of the main switch, and the circuit of this magnet extends through a slip switch which is held closed during normal running of the motor but opens and interrupts the magnet circuit at the commencement of backward rotation of the rotor so that the magnet becomes de-energized and the reverse switch opens, disconnecting the motor from the supply circuit.

The motor is usually geared or belted to machinery and, while the motor and machine are stopped, it sometimes becomes necessary for the operator to turn the machine by hand power and this causes the rotor of the motor to turn. If the rotor is turned slightly in the direction in which it normally runs, the slip switch will close the circuit of the magnet controlling the reverse switch and the latter switch will close and the rotor will be given a backward impulse, by current from the supply circuit, which may cause injury to the machine, or the work in the machine, or the operator.

To prevent accidental closure of the circuit of the reverse switch magnet while the motor is stopped, I provide a relay switch in said circuit which keeps the circuit closed after the opening of the main switch and until the rotor has come to rest, when the circuit of the relay coil is opened by the slip switch, upon the slightest backward movement of the rotor, and the relay switch then opens the circuit of the reverse switch magnet. The coil of the relay switch cannot be re-energized except by closure of both the main switch and the slip switch; hence, while the main switch is open and the motor is stopped the accidental closure of the slip switch, as by manual rotation of the motor, will not affect the relay and the circuit of the magnet which operates the reverse switch will remain open at the relay switch as long as the motor is stopped.

In the accompanying drawing, in which the invention is illustrated diagrammatically, M indicates an induction motor of the wound rotor type, S indicates the main switch for connecting the motor to the supply circuit to cause the rotor to turn in the proper direction to drive its load, and R indicates a normally open switch for reversing the current phases in the motor, after the main switch opens, in order to apply braking power to the rotor. The supply wires leading from the current source are indicated at $a$, $b$ and $c$. When the main switch is closed its blade 1 connects the wire $a$ through wires 2 and 3 to one terminal of the stator winding of the motor. The blade 4 connects the wire $b$ through conductors 5 and $5^a$ to another terminal of the stator winding and the blade 6 connects the wire $c$ through conductors 7 and $7^a$ to the third terminal of said winding. When the main switch is open and the reverse switch is closed, the blade 8 on the latter switch connects the supply wire $b$ through conductors 2 and 3 to the motor; the blade 9 connects the supply wire $a$, through conductors 10 and $5^a$ to the motor and the blade 11 connects the wire $c$ through conductors 12 and $7^a$ to the motor.

The main switch may be operable manually, or, as shown, by electromagnetic means. In the drawing, 13 indicates the coil of a magnet for closing the switch, and this coil is connected by conductor 14 to the supply wire $a$ and by conductor 15 to a normally closed push button switch 16. From thence the circuit extends through a normally open push button switch 17 and conductor 18 to supply wire $b$. A conductor 19 connects a stationary contact 20 on the main switch to the solenoid circuit at a point between the push button switches. With this arrangement, when the normally open push button switch 17 is closed, a circuit is completed through the coil 13 and the main switch closes, causing the motor to start and run in the direction indicated by the arrow. The switch arm 4 connects the supply wire $b$ to the conductor 19 and thus completes a circuit for the coil in shunt to the normally open push button switch so that the coil will be energized after the latter switch has been released. When the push button switch 16 is depressed, the circuit through the solenoid coil will be broken and the main switch will open and disconnect the motor from the supply circuit.

The reverse switch R is normally open, and a magnet coil 21 is provided for causing this switch to close when the coil is energized. The circuit for this coil extends from the supply wire $a$, through conductor 22 to a relay switch $d$, which is normally open, thence through conductor 23 to one terminal of the coil, thence through conductor 24 to a switch $e$, thence through conductors 25 and 26 to supply wire $b$. The switch $e$ comprises stationary contacts which are engaged by a contact plate 27 on an extension of the main switch arm 1. When the main switch is open, the switch $e$ is closed and when the main switch closes it opens the switch $e$, so that the circuit through the coil of the reverse switch can never be completed until the main switch has opened.

The relay switch $d$, which is normally open, is adapted to be closed by the coil 28, when energized. This coil has one terminal connected by conductor 29 to the auxiliary contact 30 on the main switch and the other terminal of the coil is connected by conductor 31 to the movable contact arm 32 of a slip switch $f$, arranged at one end of the motor. The stationary member 33 of this switch is connected by conductor 34 to conductor 26 which leads to the supply wire $b$. The slip switch is conventionally illustrated in the drawing of the present application. As shown, the switch blade 32 is mounted upon a split clamping ring 35, which frictionally engages the motor shaft 36. The contact 33 is mounted upon a stationary support 37 and a stop 38 is also mounted upon said support. When the motor turns in the direction indicated by the arrow, the blade 32 engages the stationary contact 33, completing the relay magnet circuit at this point, and when the motor starts to reverse the blade 32 is moved away from the contact 33, interrupting this circuit, and rests against the fixed stop 38. When the main switch closes, the motor will start and turn in the direction indicated by the arrow, closing the switch $f$, and a circuit will be completed through the relay magnet coil as follows: From the supply wire $a$, through the main switch arm 1 and contact 30 to conductor 29, thence through the coil 28 and conductor 31 to the switch blade 32 and contact 33, and thence through conductors 34 and 26 to the supply wire $b$. The relay switch $d$ will close immediately upon closure of the main switch and the slip switch, and when the relay switch closes it will connect one terminal of the coil 21 of the reverse switch to the supply wire $a$, through conductor 23, switch $d$ and conductor 22. The coil will not be energized, however, because its circuit is open at the switch $e$ as long as the main switch is closed. When the relay switch closes it establishes a holding circuit for its coil 28 in parallel with the circuit through the main switch. This shunt or holding circuit extends from supply wire $a$, through conductor 22 to switch $d$ and thence by conductor 39 to the conductor 29 which leads from the main switch to the coil. Hence, after the relay switch has closed, current will flow from the supply wire $a$ through conductor 22, relay switch $d$ and conductor 39 to coil 28, thence through conductor 31, slip switch $f$ and conductors 34 and 26 to the supply wire $b$. This circuit through the relay coil will be maintained after the main switch opens and until it is interrupted at the slip switch by reversal of the motor.

The operation is as follows: To start the motor, the start push button 17 is depressed and the main switch closes the circuit through the motor and also connects one terminal of the relay coil to the supply wire $a$. The closure of the main switch causes the switch $e$ to open and disconnect one terminal of the reverse switch coil 21 from the supply wire $b$. When the motor starts to rotate the circuit through the relay coil is completed at the friction switch to the supply wire $b$. The relay switch then closes, connecting one terminal of the reverse switch coil 21 to the supply wire $a$ and also completing the holding circuit for the relay coil in parallel to the main switch. When it is desired to stop the motor, the stop push button switch 16 is depressed, interrupting the circuit through the coil 13 of the main switch, and the latter switch opens, cutting off the current from the motor. When the main switch reaches its full open position, the switch $e$, which is associated with the main switch, closes the circuit of the reverse switch coil 21 and the reverse switch is then moved to closed position and the current phases in the motor are reversed, causing the desired braking action. As soon as the rotor comes to rest it starts in the reverse direction and at the commencement of this reverse movement, the slip switch opens, thereby interrupting the circuit through the relay coil and the relay switch opens and breaks the circuit through the actuating coil of the reverse switch. The reverse switch then opens and disconnects the motor from the line. The opening of the slip switch, relay switch and reverse switch take place in rapid succession so that the rotor stops after it has made only a part of a revolution in the backward direction.

It is to be noted that when the motor is at rest and the switches are in their normal positions, as shown in the drawing, accidental closure of the slip switch will not cause the motor to start. Where the motor is geared or otherwise connected to a machine, such as a printing press, for instance, the operator in adjusting or working about the machine while the motor is stopped, may cause rotation of the rotor and closure of the slip switch. If this switch directly controlled the circuit of the reverse switch coil, the latter switch would close and cause reversal of the motor; but as the circuit of the coil of the reverse switch is open at the relay switch and the circuit of the relay coil is also open at the relay switch and at the main switch while the motor is stopped, the accidental closure of the slip switch cannot cause the closure of the relay switch or the reverse switch.

What I claim is:

1. The combination with a multiphase alternating current supply circuit, an induction motor and normally open main and reverse switches for connecting the motor to the supply circuit, of a magnet for closing the reverse switch, a circuit for said magnet including a switch adapted to be closed by the main switch when the latter opens and including also a normally open relay switch, a circuit for the relay magnet, means for closing the last mentioned circuit when the main switch closes and the rotor of the motor starts in one direction, said last mentioned means including a slip switch adapted to open the circuit of the relay magnet when the rotor starts to reverse.

2. The combination with a multiphase alternating current supply circuit, an induction motor and main and reverse switches for connecting the motor to the supply circuit, of a slip switch adapted to be held closed by the rotor of the motor during normal running and to open upon reverse movement of the rotor, a normally open relay switch, a circuit for the coil of the relay switch adapted to be initially completed by the closure of the main switch and the slip switch, a holding circuit for the relay coil adapted to be completed by the closure of the relay switch and to be interrupted, when the motor reverses, by the slip switch, a magnet for closing the reverse switch, and a normally open circuit for the coil of said magnet adapted to be completed by the closure of the relay switch and the opening of the main switch.

In testimony whereof I affix my signature.

GEORGE H. WHITTINGHAM.